United States Patent
Ali et al.

(10) Patent No.: US 7,541,977 B2
(45) Date of Patent: Jun. 2, 2009

(54) METHOD AND WIRELESS COMMUNICATION SYSTEM FOR LOCATING WIRELESS TRANSMIT/RECEIVE UNITS

(75) Inventors: Ahmed Ali, Verdun (CA); Athmane Touag, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 275 days.

(21) Appl. No.: 11/014,254

(22) Filed: Dec. 16, 2004

(65) Prior Publication Data

US 2005/0151686 A1  Jul. 14, 2005

Related U.S. Application Data

(60) Provisional application No. 60/530,064, filed on Dec. 16, 2003.

(51) Int. Cl.
*G01S 1/24* (2006.01)
(52) U.S. Cl. .................... 342/463; 342/387; 455/456.2; 455/456.5
(58) Field of Classification Search ......... 342/450–451, 342/457, 463–464, 386–387; 455/404.2, 455/456.1–456.2, 456.6
See application file for complete search history.

(56) References Cited

U.S. PATENT DOCUMENTS

| | | | | |
|---|---|---|---|---|
| 4,799,062 | A | * | 1/1989 | Sanderford et al. ......... 342/450 |
| 5,150,310 | A | * | 9/1992 | Greenspun et al. .......... 342/451 |
| 5,758,288 | A | * | 5/1998 | Dunn et al. .............. 455/456.5 |
| 6,990,428 | B1 | * | 1/2006 | Kaiser et al. ................ 702/150 |
| 2001/0022558 | A1 | * | 9/2001 | Karr et al. .................... 342/450 |
| 2001/0051526 | A1 | * | 12/2001 | Ruutu et al. ................ 455/456 |
| 2002/0013153 | A1 | * | 1/2002 | Wilcock et al. ............. 455/456 |
| 2002/0183069 | A1 | * | 12/2002 | Myr ........................... 455/456 |
| 2003/0009761 | A1 | * | 1/2003 | Miller et al. ................... 725/76 |
| 2003/0054830 | A1 | * | 3/2003 | Williams et al. ............ 455/456 |
| 2005/0277426 | A1 | * | 12/2005 | Evans et al. ............. 455/456.1 |

* cited by examiner

*Primary Examiner*—Thomas G Black
*Assistant Examiner*—Shelley Chen
(74) *Attorney, Agent, or Firm*—Volpe and Koenig PC

(57) ABSTRACT

A method and system for locating a wireless transmit/receive unit (WTRU) is disclosed. A wireless communication system comprises a plurality of access points (APs). Each AP broadcasts a message indicating class-of-service (COS) types that the wireless communication system supports. After a WTRU registers with one of the plurality of APs, the WTRU receives the broadcast message. The WTRU sets a timer for location update in accordance with an application that the WTRU is running and the COS type with which it is associated. The WTRU transmits a location update frame to the APs at the expiration of the timer, and a location of the WTRU is calculated using the location update frame.

13 Claims, 3 Drawing Sheets

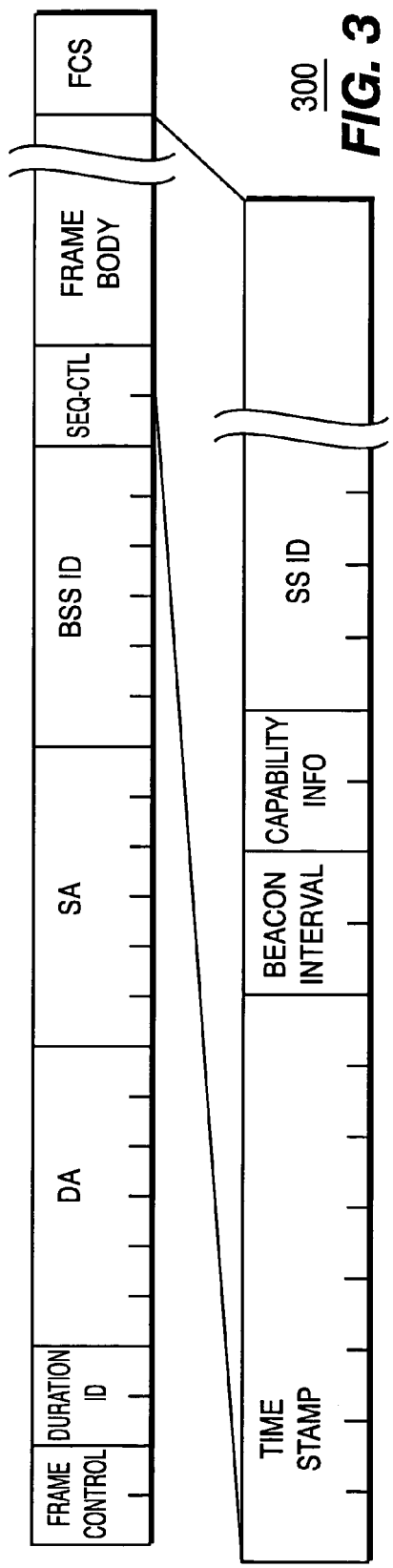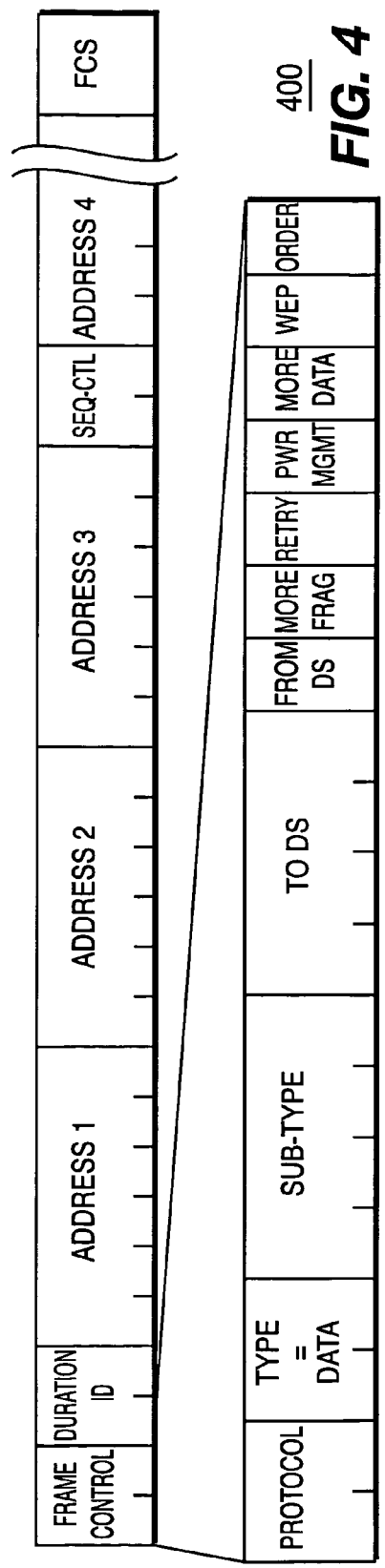

METHOD AND WIRELESS COMMUNICATION SYSTEM FOR LOCATING WIRELESS TRANSMIT/RECEIVE UNITS

CROSS REFERENCE TO RELATED APPLICATION

This application claims the benefit of U.S. Provisional Application No. 60/530,064 filed Dec. 16, 2003, which is incorporated by reference as if fully set forth.

FIELD OF INVENTION

The present invention is related to wireless communication systems. More particularly, the present invention is a method and system for locating a wireless transmit/receive unit (WTRU).

BACKGROUND

Many technologies for locating mobile units have been developed; particularly in response to recently enacted legislation regarding positioning in the event of an emergency. Wireless carriers are required to provide the location of an emergency caller, (such as a 911 caller), for public safety purposes.

In addition to emergency services, numerous geolocation-based applications are envisioned for the future. Among them are network optimization, where spatio-temporal wireless traffic distribution is used in planning, design, and operation of wireless networks; information services such as providing mobile users with directions to gas stations, restaurants, hotels or the like; tracking of personnel, vehicles, and assets in managing company operations; and location-sensitive billing of mobile users to enable more precise rate structures for wireless service providers.

One widely used geolocation method is the use of the Global Positioning System (GPS) and incorporation of GPS receivers into a mobile unit. However, conventional GPS receivers require a clear view of the skies and signals from at least three satellites, which largely precludes operation in buildings or other RF-shadowed environments. Furthermore, it may take up to several minutes to achieve a location fix on a mobile station. This is too considerable a delay for many applications, especially for emergency services. Finally, there remain questions of cost, size, and power consumption when incorporating GPS receivers into trendy, miniature handsets.

One of the alternatives to GPS positioning is to use time difference of arrival (TDOA) technology in the uplink in which a mobile unit transmits a specific packet to three (3) or more base stations to calculate the location of the mobile unit. The differences in time of arrival at the base stations are utilized in a triangulation method to determine the physical location of the mobile unit.

Although TDOA is currently one of the primary methods used to locate a mobile unit making an emergency call, there are drawbacks with utilizing TDOA. Activation of the location updating procedure is typically responsive to initiation of an emergency call. Prior art systems also employ a fixed period for updating the position of the mobile unit which is independent of any factors related to the application or environment in which the mobile unit is operating. Moreover, this capability is not available in wireless local area networks (WLANs).

SUMMARY

The present invention is related to a wireless communication system and method for locating a wireless transmit/receive unit (WTRU). The system comprises a plurality of access points (APs). Each AP broadcasts a message indicating the class-of-service (COS) types that the wireless communication system supports. A WTRU registers with one of the plurality of APs and informs the AP of its capabilities. The WTRU then receives the broadcast message and confirms the capability (or, lack thereof) of the WTRU to support the COS types. The WTRU sets a timer for a location update in accordance with the COS type of an application that the WTRU is running. The WTRU transmits a location update frame to the APs at the expiration of the timer, and the location of the WTRU is calculated using the location update frame.

BRIEF DESCRIPTION OF THE DRAWINGS

FIG. 3 is a diagram of an example of a beacon frame in accordance with the present invention.

FIG. 4 is a diagram of an example of a media access control (MAC) location update frame in accordance with the present invention.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "access point" (AP) includes but is not limited to a Node-B, a base station, a site controller, or any other type of interfacing device in a wireless environment.

The present invention is applicable to any wireless communication system including, but not limited to, universal mobile telecommunication systems (UMTS), the global system for mobile communication (GSM), IEEE 802.11 systems, or the like.

Figure 1:
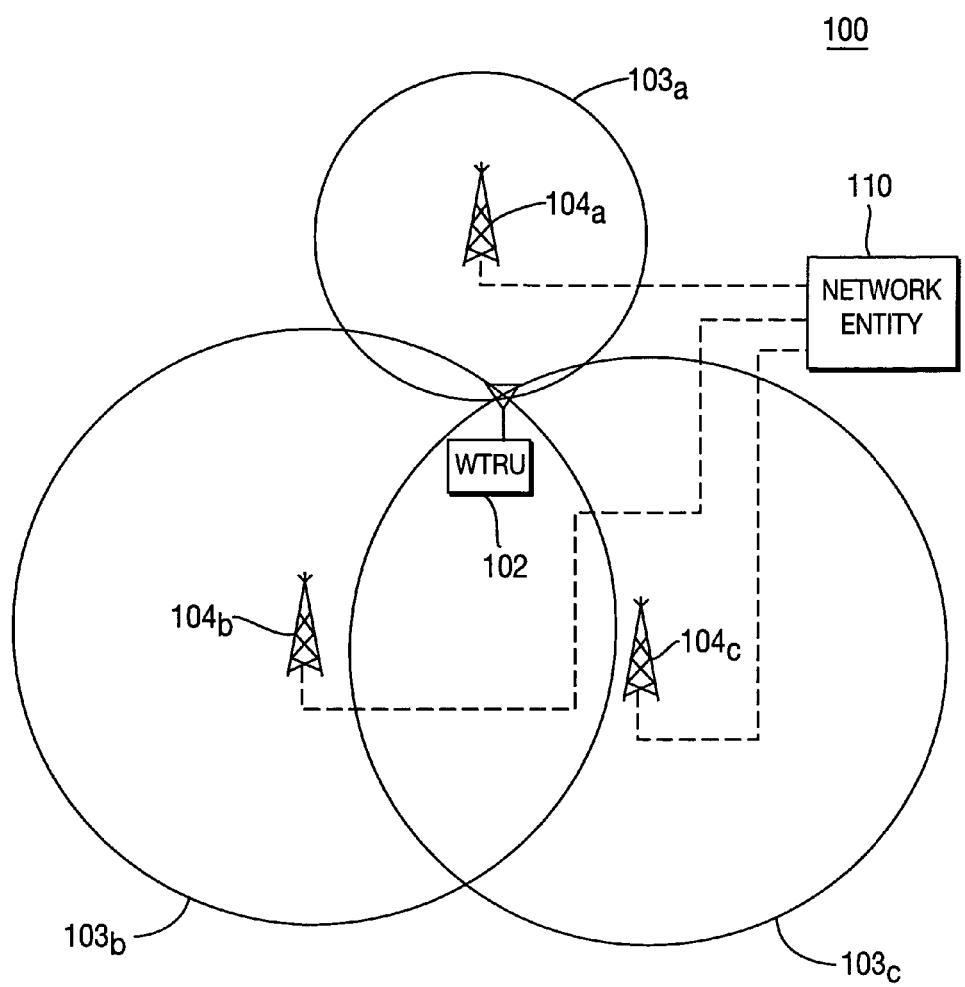
FIG. 1 is a diagram of a wireless communication system for locating a WTRU using a TDOA method in accordance with the present invention.

FIG. 1 shows a wireless communication system 100 comprising a plurality of APs 104a, 104b, 104c, that communicate with at least one WTRU 102 and a network entity 110. There may be several communication systems overlaid upon each other, (whereby APs 104a-c in the geographic vicinity of each other may be associated with different communication systems, WLANs or WWANs). However, for the purposes of explanation of the present invention, the APs 104a-c will be described as being associated with a single wireless communication system 100. Additionally, although the APs 104a-c typically communicate with a plurality of WTRUs 102, only one is shown for simplicity.

In accordance with the present invention, the wireless communication system 100 supports one or more class of service (COS) types. The APs 104a-c broadcast a message indicating the COS types that the wireless communication system 100 supports.

The COS types that are supported by the wireless communication system 100 are typically determined by the specific deployment of the wireless communication system 100. Each COS type includes a number of different applications having common requirements in terms of a transmission rate, delay requirements, specific configuration procedures, quality of service, or the like. For example, different COS types can include voice, video streaming, and internet, each of which would have different delay requirements, etc. Although in the preferred embodiment of the present invention each COS type also includes an associated "location update" period, which is also assigned to each application with that particular COS type, each application may be directly associated with its own location update period.

After the WTRU 102 is registered with one of the APs 104a-c, the WTRU 102 transmits a message, called a location update frame 400, (as will be described in greater detail hereinafter with reference to FIG. 4), to preferably at least three (3) APs 104a-c. In a first embodiment, the location update frame 400 is transmitted specifically to each of the three (3) APs 104a-c. Alternatively, all three APs 104a-c listen for a location update frame 400 that is broadcast by the WTRU 102.

The APs 104a-c receive the location update frame 400 and calculate the time difference of arrival (TDOA) of the location update frame 400. The TDOA at each AP 104a-c is collected by a particular network entity, such as network entity 110. Although the present invention is described as having a discrete network entity 110 performing the calculations necessary to determine the position of the WTRU 102, the network entity 110 could be co-located with one of the APs 104a-c, or the functionality may be incorporated directly into one or more of the APs 104a-c.

Since the APs 104a-c are fixed in location and these locations are known to the system operator, the TDOA information, (as graphically represented by the curves 103a-c), is combined with the known physical location of the APs 104a-c. The point of intersection of the curves 103a-c as shown in FIG. 1 determines the location of the WTRU 102 via standard triangulation calculations.

The location of the WTRU 102 is periodically updated by the WTRU 102 periodically transmitting the location update frame 400. Preferably, the location update period is set in accordance with the COS type of the application that the WTRU 102 is running. For example, if the application is a voice-related application, the application would be part of the voice COS type, which would have a specific location update period. Likewise, if the application is an emergency-related application such as a 911 service, it would be part of the emergency COS type and would likely have a much shorter location update period. Accordingly, the application run by the WTRU 102 determines the COS type to be supported and, thus, the location update period.

As aforementioned, in an alternative embodiment, a location update period may be associated directly with each application, and the location update frame 400 may be sent in accordance with the period associated with the application the WTRU 102 is running.

Figure 2:
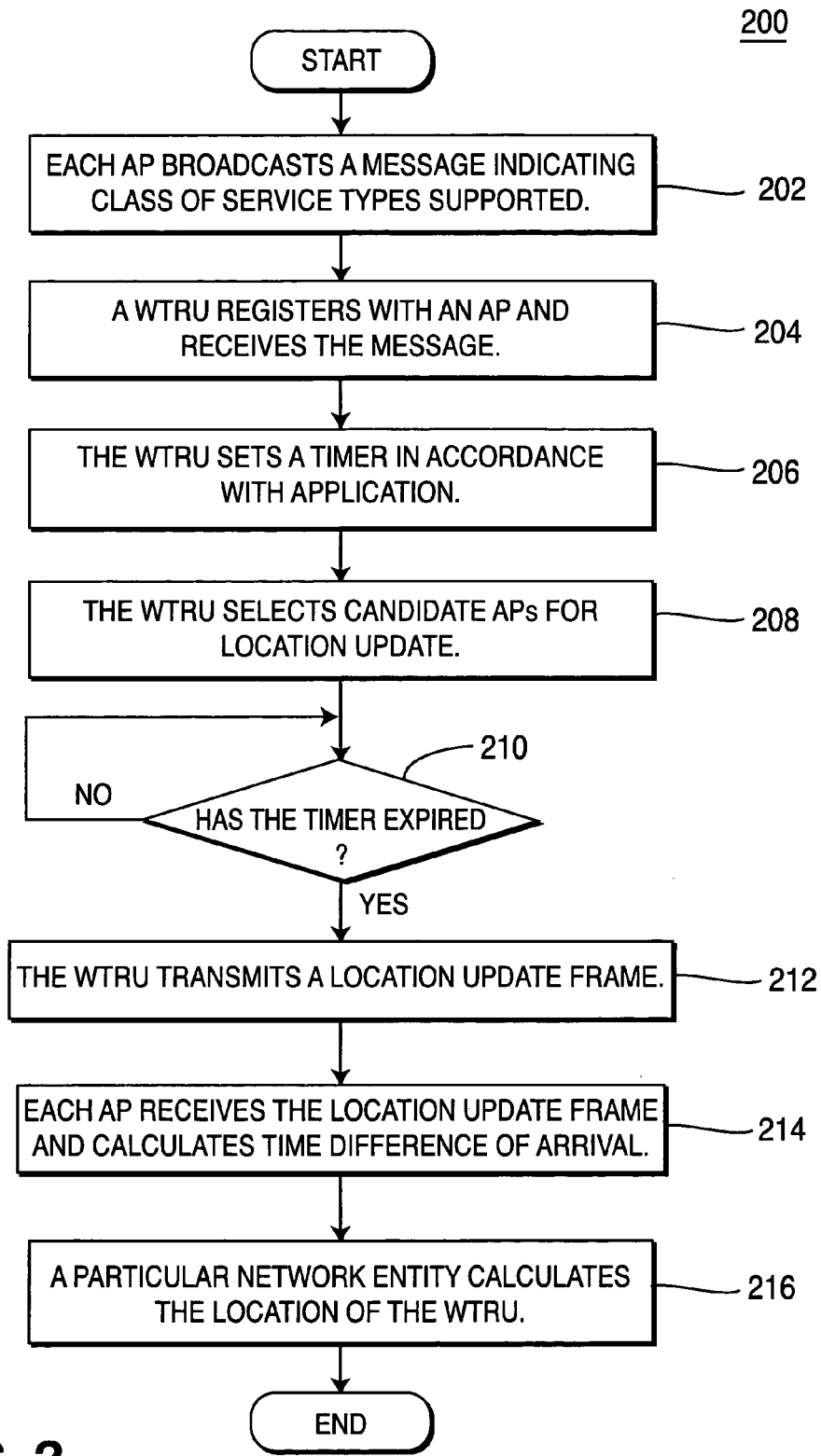
FIG. 2 is a flow diagram of a process for locating a WTRU in accordance with the present invention.

FIG. 2 is a flow diagram of a process 200 for locating a WTRU 102 in accordance with the present invention. The APs 104a-c broadcast a message indicating the COS types supported by the wireless communication system 100 (step 202). The message is preferably included in a beacon frame 300, (an example of which is shown in FIG. 3 and will be described in detail hereinafter). Referring back to FIG. 2, after the WTRU 102 registers with an AP 104a-c of the wireless communication system 100, the WTRU 102 receives the broadcast message and performs a comparison of the identified COS types with the capability of the WTRU 102 and confirms the capability of the WTRU 102, (or lack thereof), to the AP 104a-c (step 204). The WTRU 102 also stores the COS type information as a system parameter.

If the WTRU 102 cannot support one or more COS types, it may not use those applications associated with the unsupported types; or location services for those applications will be unavailable. Alternatively, the WTRU 102 may request a modification to the COS type.

The WTRU 102 may request a modification of the location update period depending on the requirements of the WTRU 102. For example, if a particular application would normally be included within one COS type, but the application requires a more frequent location update, the WTRU 102 may request that the particular application be temporarily associated with COS type having a shorter location update period. The WTRU 102 sends a message requesting the temporary COS type change, and the AP 104a-c authorizes or denies such a change. If approved, both the WTRU 102 and the AP 104a-c then treat this application as being in the COS type requiring a shorter location period. The COS type change may be temporary or permanent depending upon the needs of the WTRU 102.

A request to change the COS type to one requiring a longer location update period may also be made in the same manner as described above. The reasons for such a change may include conservation of battery resources of the WTRU 102, (since less frequent updates would require less energy resources), or simply that the WTRU 102 cannot support such a frequent location update.

Upon completion of the registration and confirmation that the COS types can be supported, the WTRU 102 sets a timer to trigger transmission of the location update frame 400 in accordance with the proper location update period (step 206). As aforementioned, the location update period is determined by the COS type and the application run by the WTRU 102. When a particular application is launched by the WTRU 102, the application uses the location update period associated with its COS type.

After setting the timer, the WTRU 102 listens to the transmissions of surrounding APs 104a-c, and selects a predetermined number of APs 104a-c, (preferably three (3)), having the strongest signals (step 208). The WTRU 102 stores the selected APs 104a-c as candidates for the location update procedure. The WTRU 102 periodically updates the list of the candidate APs 104a-c.

The WTRU 102 then determines whether the timer has expired (step 210). Upon expiration of the timer, the WTRU 102 sends a location update frame 400 to the candidate APs 104a-c (step 212).

Each of the APs 104a-c that receive the location update frame 400 calculates the TDOA of the location update frame 400 (step 214). The TDOA is calculated using the receipt time of the location update frame 400 at the AP 104a-c and the frame generation time embedded in the frame body. The TDOA calculated at each AP 104a-c is forwarded to the network entity 110, and the location of the WTRU 102 is calculated using standard triangulation methods (step 216). As aforementioned, the network entity 110 may be one of the APs 104a-c that received the location update frame 400, or any other entity that is in charge of controlling the wireless communication system 100.

The network entity 110 determines the location of the WTRU 102 based on the TDOA information and the known locations of the APs 104a-c; the location of each AP 104a-c being preferably stored in the memory of the network entity 110. From the TDOA information with known physical location of the APs 104a-c, several curves 103a-c are generated. The point of intersection of the curves 103a-c determines the location of the WTRU 102 using standard triangulation methods.

In the event that one or more of the candidate APs 104a-c is busy with another WTRU, the WTRU 102 transmits the location update frame 400 again within a period that is a pre-defined fraction of the location update period. If one or more of the candidate APs 104a-c is still busy, the busy AP 104a-c may be dropped and the location of the WTRU 102 is calculated only with the available APs 104a-c. In this case the accuracy of the location calculation is degraded since the best APs 104a-c for the calculation are not being used.

The location information of a WTRU 102 may then be utilized by the wireless communication system 100, the WTRU 102 or system administrators/remote users outside of the wireless communication system 100.

Referring to FIG. 3, a beacon frame 300 including the broadcast message of the supported COS types in accordance with the present invention is shown. The beacon frame 300 is one of the management frames transmitted by the APs 104a-c. The message is preferably included in the capability information field of the beacon frame 300. However, those of skill in the art would realize that the message may be included in one or more different existing fields as shown in the beacon frame 300 of FIG. 3, or one or more new fields may be added for this function. The message regarding the COS types to be supported could further be delineated as to which applications the wireless communication system 100 supports: for example: voice, video streaming, interactive, background. Alternatively, the location update period may be specified per application type, or the WTRU 102 can infer the location period based on the COS and the application.

A location update frame 400 in accordance with the present invention is shown in FIG. 4. The location update frame 400 is a specific type of media access control (MAC) frame. Since this MAC frame is well known to those of skill in the art, the purpose and function of each field will not be described in detail. In order to distinguish the location update frame 400 from other MAC frames, the sub-type field of the frame control section is set to a suitable value, such as a value that is currently unused in a wireless communication standard.

In terms of a wireless environment, the location updating in accordance with the present invention has a higher accuracy in a WLAN implementation than in the typical cellular wireless network due to the proximity of APs within a WLAN. The further the WTRU moves from the urban areas, the greater the distance the APs will be, which results in greater inaccuracies in determining the location of the WTRU.

The present invention expands the capability of prior art U-TDOA methods beyond emergency call implementation and is adaptable to allow WTRUs to be used for different applications and in different wireless communication system 100 and be totally transparent to the user.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for updating a location of a wireless transmit/receive unit (WTRU), the method comprising:
   a WTRU receiving a message including a plurality of supported class-of-service (COS) types and associated COS-specific location update periods;
   the WTRU setting a timer to a COS-specific location update period that is determined based on the COS type of an application that the WTRU is currently running; and
   the WTRU periodically transmitting a location update frame at an expiration of the timer.

2. The method of claim 1, wherein the COS type is determined by at least one of transmission speed, quality of service, configuration procedures and delay requirements.

3. A wireless transmit/receive unit (WTRU) comprising:
   a timer, the timer being based on a class-of-service (COS)-specific location update period determined based on a COS type of an application that the WTRU is currently running; and
   a transceiver for receiving a message including a plurality of supported COS types and associated COS-specific location update periods, and periodically transmitting a location update frame at an expiration of the timer.

4. The WTRU of claim 3 wherein the COS type is determined by at least one of transmission speed, quality of service, configuration procedures and delay requirements.

5. A method for locating a wireless transmit/receive unit (WTRU), the method comprising:
   an access point (AP) broadcasting a message a plurality of supported class-of-service (COS) types and associated COS-specific location update periods;
   the AP receiving a location update frame periodically from a WTRU, the location update frame being periodically sent at an expiration of a timer that is set to a COS-specific location update period determined based on a COS type of an application that the WTRU is currently running;
   the AP calculating a location of the WTRU using the location update frame; and
   the AP implementing a location-based service based on the location of the WTRU.

6. The method of claim 5 wherein the location of the WTRU is determined by calculating time difference of arrival (TDOA) of the location update frame.

7. The method of claim 5 wherein said message is included in a beacon frame.

8. The method of claim 7 wherein said message is included in a capability field of the beacon frame.

9. An access point (AP) comprising:
   a transmitter for broadcasting a message including a plurality of supported class-of-service (COS) types and associated COS-specific location update periods;
   a receiver for receiving a location update frame from a wireless transmit/receive unit (WTRU), the location update frame being sent periodically at an expiration of a timer that is set to a COS-specific location update period determined based on a COS type of an application currently running at the WTRU; and
   a calculation unit for calculating a location of the WTRU based on the location update frame.

10. The AP of claim 9 wherein the calculation unit calculates the location of the WTRU using a triangulation method.

11. The AP of claim 10 wherein the COS type is determined by at least one of transmission speed, quality of service, configuration procedures and delay requirements.

12. The AP of claim 9 wherein said message is included in a beacon frame.

13. The AP of claim 12 wherein said message is included in a capability field of the beacon frame.

* * * * *